United States Patent
Xu

(10) Patent No.: US 11,173,595 B2
(45) Date of Patent: Nov. 16, 2021

(54) SELF-BALANCED SWIVELING OBSTACLE-CROSSING ROBOT FOR TRANSMISSION LINES

(71) Applicant: Bradley Jiping Xu, Mountain View, CA (US)

(72) Inventor: Bradley Jiping Xu, Mountain View, CA (US)

(*) Notice: Subject to any disclaimer, the term of this patent is extended or adjusted under 35 U.S.C. 154(b) by 173 days.

(21) Appl. No.: 16/740,404

(22) Filed: Jan. 11, 2020

(65) Prior Publication Data

US 2020/0238504 A1 Jul. 30, 2020

(51) Int. Cl.
*H02G 1/02* (2006.01)
*B25J 9/00* (2006.01)
*B25J 9/02* (2006.01)
*B25J 9/16* (2006.01)
*B25J 5/00* (2006.01)

(52) U.S. Cl.
CPC ............. *B25J 9/0009* (2013.01); *B25J 5/007* (2013.01); *B25J 9/02* (2013.01); *B25J 9/1638* (2013.01); *H02G 1/02* (2013.01)

(58) Field of Classification Search
CPC ... B25J 5/007; B25J 9/0009; B25J 9/02; B25J 9/1638; H02G 1/02
See application file for complete search history.

(56) References Cited

U.S. PATENT DOCUMENTS 5,103,739 A * 4/1992 Sawada ............... H02G 1/02
104/112

2008/0276823 A1* 11/2008 Montambault ........... B61B 7/06
104/173.1
2015/0204480 A1* 7/2015 Lorimer ................ F16M 13/02
700/245

OTHER PUBLICATIONS

Serge Montambault et al. Reporting on a Large Ocean Inlet Crossing Live Transmission Line Inspection Performed by LineScout Technology, 2010 IEEE International Conference on Robotics and Automation Anchorage Convention District, May 3-8, 2010, Alaska, USA.

(Continued)

*Primary Examiner* — Dale Moyer
(74) *Attorney, Agent, or Firm* — Frank Gao, Esq.

(57) ABSTRACT

This new utility patent application discloses a self-balanced swiveling obstacle-crossing robot for transmission lines comprising a front running gear, a rear running gear, a front weight-shifting mechanism, a rear weight-shifting mechanism, a swiveling mechanism and a controller. The front running gear comprises an upper deck and a front wheel; the rear running gear comprises a lower deck and a rear wheel; both the front and rear wheels are nonsymmetrical rim wheels, which move on the same transmission line by gripping on to the line; when the front and rear weights move to the rear of the upper and lower decks respectively, the upper and lower decks both incline from the front to the rear and the front wheel is lifted off the transmission line; when the front and rear weights move to the front of the upper and lower decks respectively, the upper and lower decks both incline from the rear to the front, and the rear wheel is lifted off the transmission line; the swiveling mechanism enables the upper deck to rotate horizontally relative to the lower deck. The robot of this new utility patent application is able to move stably in both directions on the transmission line, cross obstacles on the line, and cross support towers with a change in line direction.

4 Claims, 5 Drawing Sheets

(56) References Cited

OTHER PUBLICATIONS

Debenest et al, Expliner—Toward a Practical Robot for Inspection of High-Voltage Lines, FSR 2009, Jul. 14-16, 2009.

* cited by examiner

SELF-BALANCED SWIVELING OBSTACLE-CROSSING ROBOT FOR TRANSMISSION LINES

FIELD OF THE INVENTION

This new utility patent application relates to a self-balanced swiveling obstacle-crossing robot for transmission lines.

BACKGROUND OF THE INVENTION

High-voltage lines must be inspected and properly maintained after months of wear in wind, rain and air. Currently, the only approach is through manual inspection, such as, manual inspection by a human and inspection by an unmanned aerial vehicle. These two methods have the following drawbacks: manual inspection is labor intensive and slow; unmanned aerial vehicles cannot get very close to lines and are also seriously affected by weather conditions, so inspections carried out by unmanned aerial vehicles are inaccurate. The existing electrical grid consists of many towers, so lines change direction at each tower by a certain degree (large or small). There are already robots that can check high-voltage lines. They can be divided into two categories: those that cannot automatically cross the support towers and those that can. When robots that cannot automatically cross encounter transmission lines with a change in direction, they must be manually removed from the line and reattached on the other side of the tower by workers. The robots that can automatically cross support towers are all specifically designed for their local or regional electrical grid, leading to very limited real-world applications. For example, one type of robot can only run on two horizontal parallel lines. Even then, the use of these robot are still limited to straight lines.

The purpose of this new utility patent application is to overcome the defects of current technology and provide a self-balanced swiveling obstacle-crossing robot for transmission lines, which can not only stably move on the transmission line in both directions, but also cross obstacles and cross support towers with a change in line direction.

The purpose of this new utility patent application is realized by the self-balanced swiveling obstacle-crossing robot for transmission lines comprises a front running gear, a rear running gear, a front weight-shifting mechanism, a rear weight-shifting mechanism, a swiveling mechanism and a controller; specifically: the front running gear comprises an upper deck, a front arm set in the middle section of the upper deck, a driving motor for the front wheel set at the top of the front arm and a front wheel set on the driving motor for the front wheel; the rear running gear comprises a lower deck, a rear arm set in the middle section of the lower deck, a driving motor for the rear wheel set at the top of the rear arm and a rear wheel set on the driving motor for the rear wheel; the front and rear wheels are nonsymmetrical rim wheels with the same size, the front wheel and the rear wheel move on the same transmission line by gripping on to the line respectively with their wheel rims on both sides, and the front arm and the rear arm are positioned on different sides of the transmission line; the front weight-shifting mechanism comprises a front driving gear and a front driven gear respectively set at both ends of the upper deck, a front driving motor for weight shifting which is connected to the front driving gear, a flexible front conveyor belt that is annularly and tightly sleeved on the front driving gear and the front driven gear, and a front counterweight set on the flexible front conveyor belt; the rear weight-shifting mechanism comprises a rear driving gear and a rear driven wheel which are respectively set at both ends of the lower deck, a rear driving motor for weight shifting that is connected to the rear driving gear, a flexible rear conveyor belt that is annularly and tightly sleeved on the rear driving gear and the rear driven gear, and a rear counterweight set on the flexible rear conveyor belt; when the front counterweight moves to the rear of the upper deck and the rear counterweight moves to the rear of the lower deck, the upper deck and the lower deck are both inclined from the front to the rear, and the front wheel is lifted off the transmission line; when the front counterweight moves to the front of the upper deck and the rear counterweight moves to the front of the lower deck, the upper deck and the lower deck are both inclined from the rear to the front, and the rear wheel is lifted off the transmission line; the swiveling mechanism is set between the bottom surface of the upper deck at the rear and the top surface of the lower deck at the front and is driven by a motor set on the lower deck to horizontally rotate the upper deck relative to the lower deck; the controller is respectively connected to the driving motor for the front wheel, the driving motor for the rear wheel, the driving motor for the front counterweight, the driving motor for the rear counterweight and the driving motor for rotating respectively through signal lines.

The self-balanced swiveling obstacle-crossing robot for transmission lines, wherein the diameters of wheel rims on each side of the front wheel and the rear wheel are different, one large and one small; the front arm is set outside the large-diameter wheel rim of the front wheel; the rear arm is set outside the large-diameter wheel rim of the rear wheel; the large-diameter wheel rim of the front wheel and the small-diameter wheel rim of the rear wheel are positioned on the same side of the same transmission line.

The self-balanced swiveling obstacle-crossing robot for transmission lines, wherein the swiveling mechanism comprises a driving gear set on the driving motor for rotating, a driven gear meshed with the driving gear and a bearing sleeved on a rotating shaft of the driven gear, and the outer ring of the bearing is fixed on the upper surface of the lower deck; the upper part of the rotating shaft of the driven gear is inserted into a shaft bore formed on the lower surface of the upper deck.

The self-balanced swiveling obstacle-crossing robot for transmission lines, wherein the flexible front conveyor belt and the flexible rear conveyor belt are chains or timing belts.

The self-balanced swiveling obstacle-crossing robot for transmission lines of this new utility patent application not only can move stably in both directions on the transmission line, but also can cross obstacles and support towers with a change in line direction. The self-balanced swiveling obstacle-crossing robot for transmission lines of this new utility patent application is provided with the following characteristics:

1. crosses obstacles and supports with any change in line direction;
2. able to move freely on a transmission line in both directions;
3. easy to control, both remotely and manually;
4. stably moves forwards and backwards;
5. lightweight, low power consumption, and cost effective.

DETAILED DESCRIPTION OF THE PREFERRED EMBODIMENTS

This new utility application is hereinafter described in detail with reference to the accompanying drawings.

Figure 1:
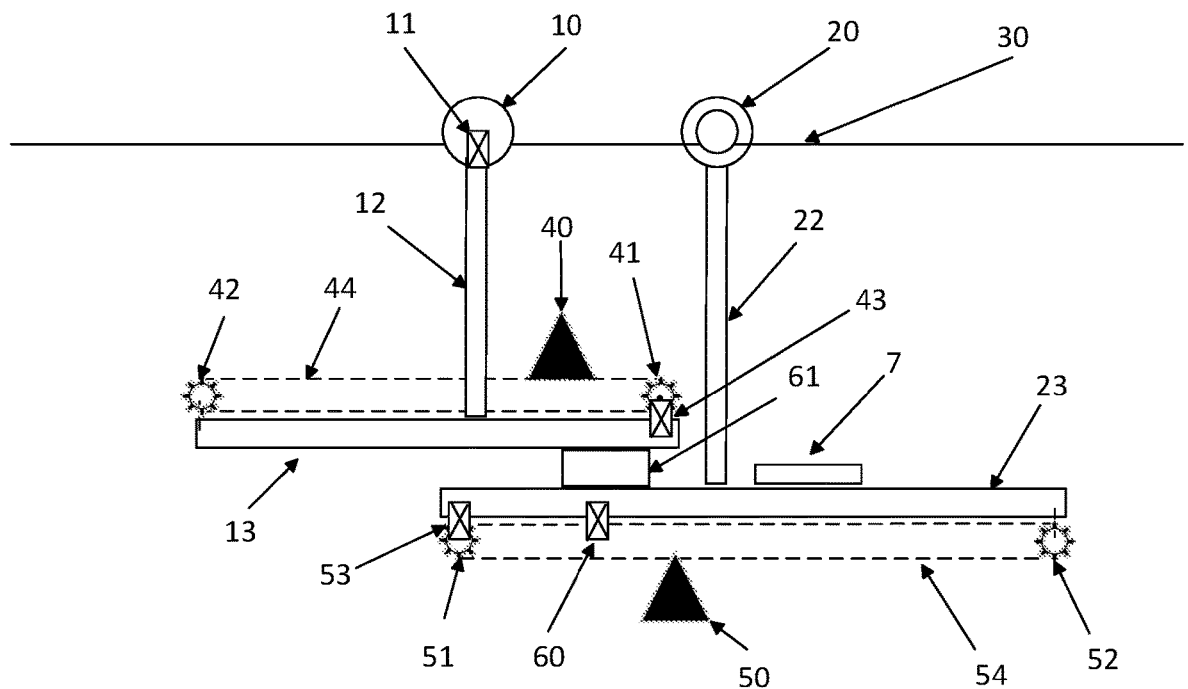
FIG. 1 is a front view of the self-balanced swiveling obstacle-crossing robot for transmission lines of this new utility patent application moving on a straight transmission line.
Figure 2:
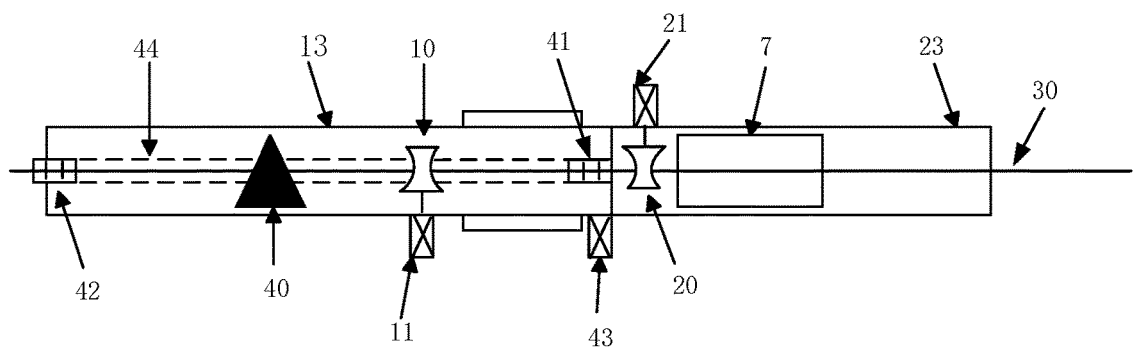
FIG. 2 is a top view of FIG. 1.

Referring to FIGS. 1 and 2, the self-balanced swiveling obstacle-crossing robot for transmission lines of this new utility patent application comprises a front running gear, a rear running gear, a front weight-shifting mechanism, a rear weight-shifting mechanism, a swiveling mechanism and a controller (7); wherein the front running gear comprises an upper deck (13), a front arm (12) set in the middle section of the upper deck (13), a driving motor for the front wheel (11) set at the top of the front arm (12) and a front wheel (10) set on the driving motor for the front wheel (11); the rear running gear comprises a lower deck (23), a rear arm (22) set in the middle section of the lower deck (23), a driving motor for the rear wheel (21) set at the top of the rear arm (22) and a rear wheel (20) set on the driving motor for the rear wheel (21); the front wheel (10) and the rear wheel (20) are nonsymmetrical rim wheels with the same size, the front wheel (10) and the rear wheel (20) move on the same transmission line (30) by gripping on the line with their wheel rims on two sides respectively, and the front arm (12) and the rear arm (22) are positioned on different sides of the transmission line (30); the front weight-shifting mechanism comprises a front driving gear (41) and a front driven gear (42) respectively set on both ends of the upper deck (13), a front driving motor for weight shifting (43) which is connected to the front driving gear (41), a flexible front conveyor belt (44) which is annularly and tightly sleeved on the front driving gear (41) and the front driven gear (42), and a front counterweight (40) set on the flexible front conveyor belt (44); the flexible front conveyor belt (44) may be a chain or a timing belt; correspondingly, the front driving gear (41) and the front driven gear (42) may be sprockets or timing pulleys; the rear weight-shifting mechanism comprises a rear driving gear (51) and a rear driven gear (52) which are respectively set at both ends of the lower deck (23), a rear driving motor for weight shifting (53) which is connected to the rear driving gear (51), a flexible rear conveyor belt (54) which is annularly and tightly sleeved on the rear driving gear (51) and the rear driven gear (52), and a rear counterweight (50) set on the flexible rear conveyor belt (54); the flexible rear conveyor belt (54) may be a chain or a timing belt; correspondingly, the rear driving gear (51) and the rear driven gear (52) may be sprockets or timing pulleys.

When the front counterweight (40) moves to the rear of the upper deck (13) and the rear counterweight (50) moves to the rear of the lower deck (23), the upper deck (13) and the lower deck (23) are both inclined from the front to the rear, and the front wheel (10) is lifted off the transmission line (30).

When the front counterweight (40) moves to the front of the upper deck (13) and the rear counterweight (50) moves to the front of the lower deck (23), the upper deck (13) and the lower deck (23) are both inclined from the rear to the front, and the front wheel (20) is lifted off the transmission line (30).

The swiveling mechanism is set between the bottom surface of the upper deck (13) at the rear and the top surface of the lower deck (23) at the front, comprising a driving motor for rotating (60) set on the lower deck (23), a driving gear (not shown in the figure) set on the driving motor for rotating (60), a driven gear (not shown in the figure) meshed with the driving gear and a bearing (61) sleeved on a rotating shaft of the driven gear, and the outer ring of the bearing (61) is fixed on the upper surface of the lower deck (23); the upper part of the rotating shaft of the driven gear is inserted into a shaft bore formed on the lower surface of the upper deck (13); the upper deck (13) rotates horizontally relative to the lower deck (23) by the operation of the driving motor for rotating (60).

The controller (7) is connected to the driving motor for the front wheel (11), the driving motor for the rear wheel (21), the driving motor for the front counterweight (43), the driving motor for the rear counterweight (53) and the driving motor for rotating (60) respectively through signal lines.

Figure 3:
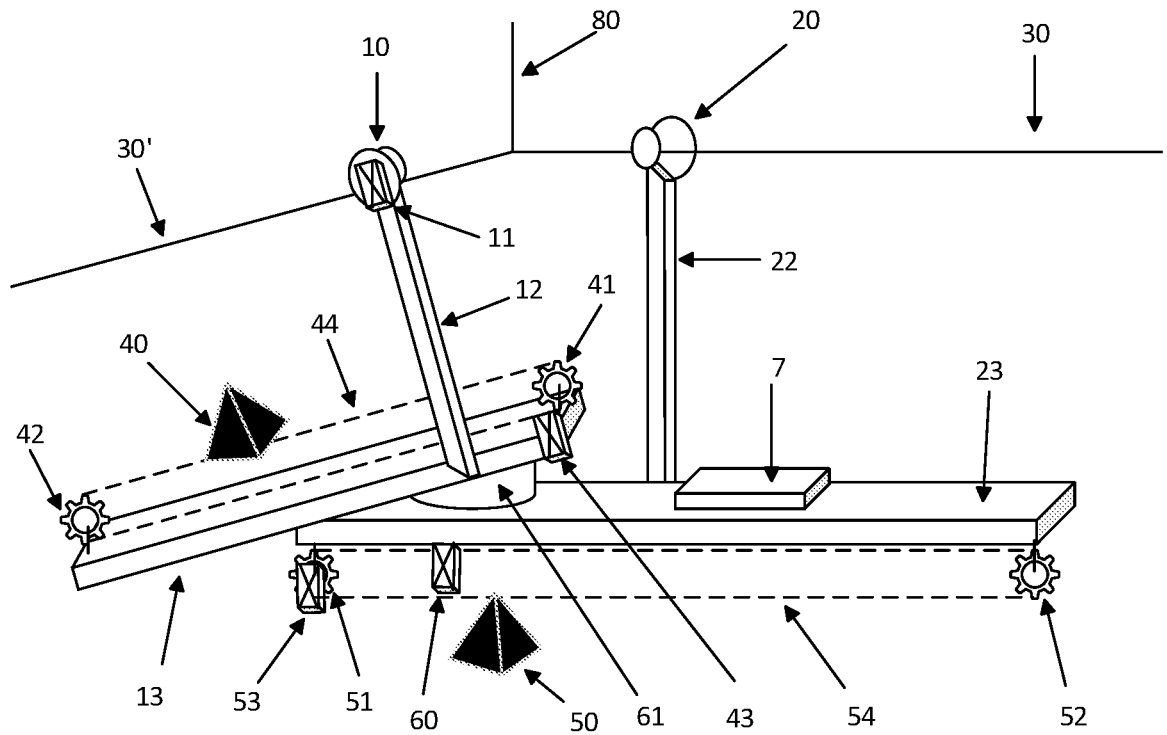
FIG. 3 is a front view of the self-balanced swiveling obstacle-crossing robot for transmission lines of this new utility patent application moving on a 45° bend on a transmission line.
Figure 4:
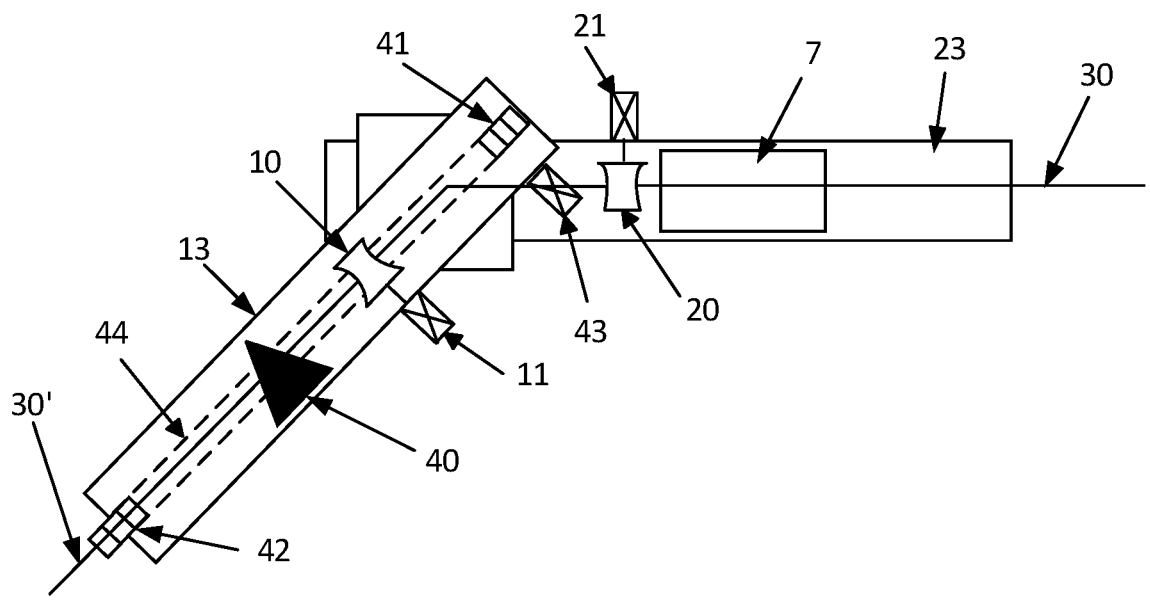
FIG. 4 is a top view of FIG. 3.
Figure 5A:
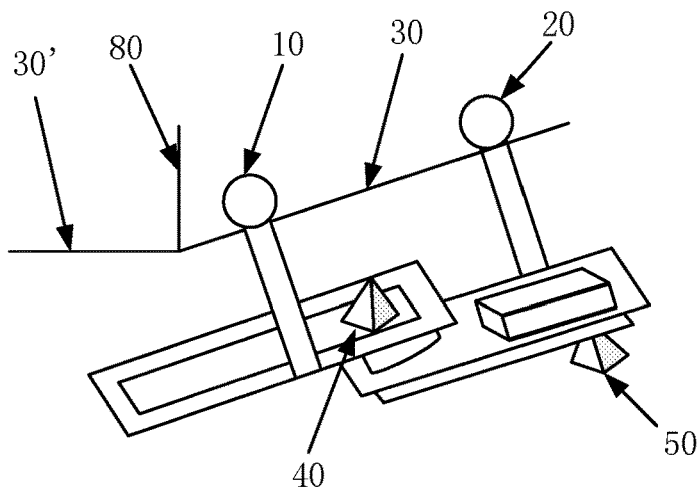
FIGS. 5a to 5g are schematic diagrams of the first operation mode to the seventh operation mode of the self-balanced swiveling obstacle-crossing robot for transmission lines of this new utility patent application.
Figure 5B:
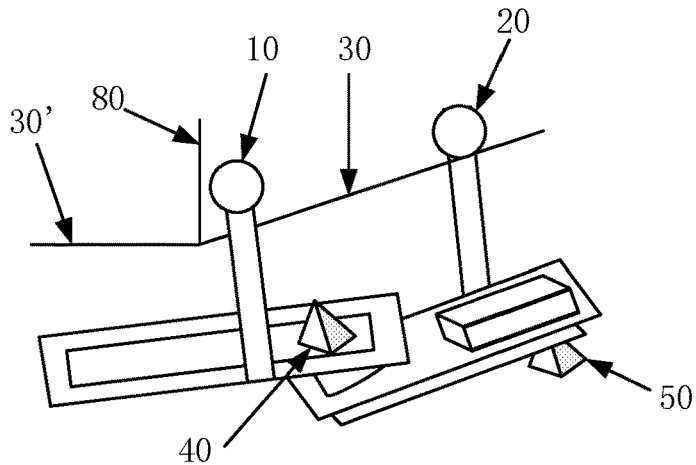
Figure 5C:
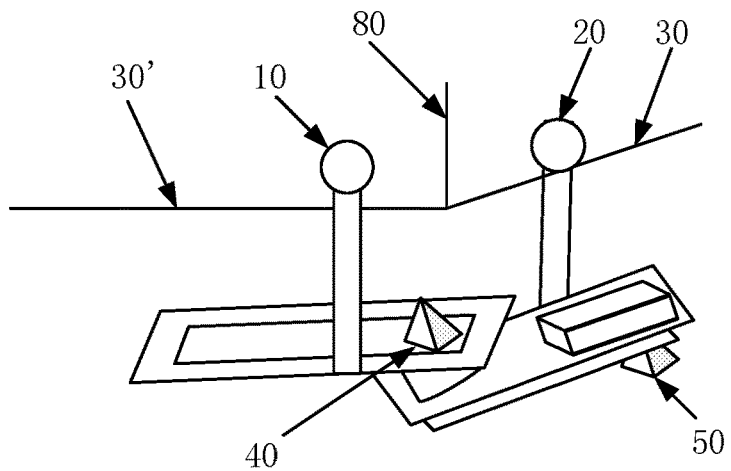
Figure 5D:
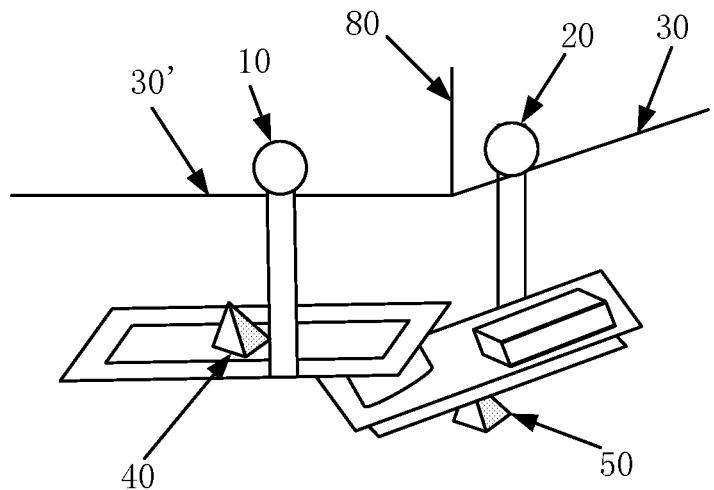
Figure 5E:
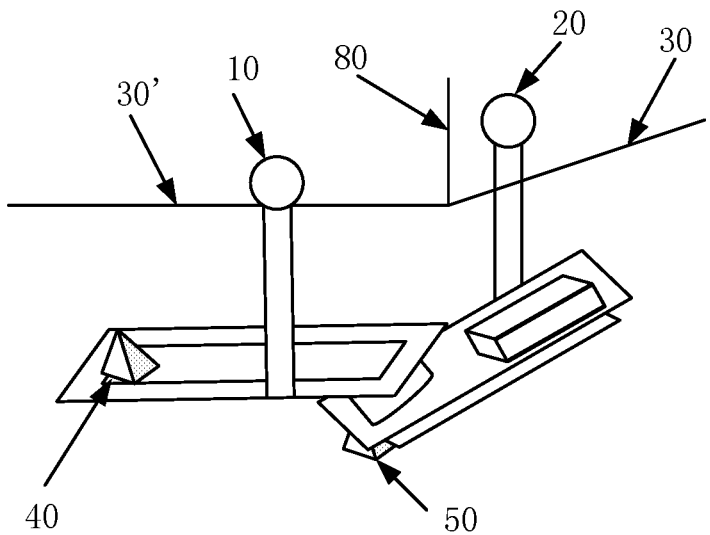
Figure 5F:
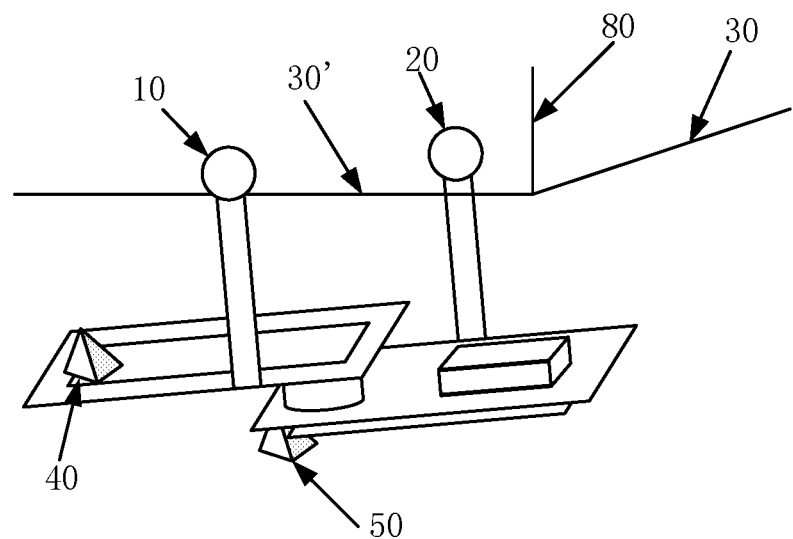
Figure 5G:
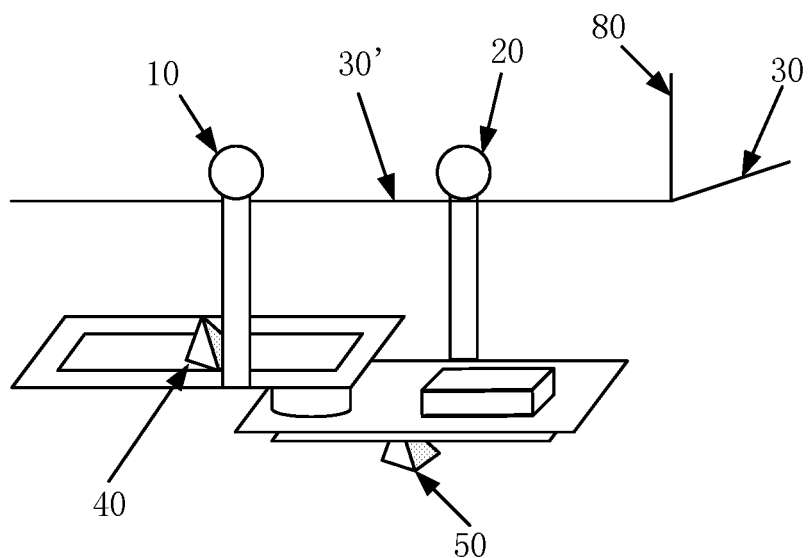

The operation mode of the self-balanced swiveling obstacle-crossing robot for transmission lines of this new utility patent application is as follows:

1. When the front wheel (10) is driven by the driving motor for the front wheel (11), and the rear wheel (20) is driven by the driving motor for the rear wheel (21) simultaneously, the robot thereby moves on the transmission line (30) normally, the upper deck (13) and the lower deck (23) are positioned horizontally by the front weight-shifting mechanism and the rear weight-shifting mechanism, and the front wheel (10) and the rear wheel (20) are both gripped on the transmission line (30) (see FIG. 5a);

2. When the front wheel (10) encounters an obstacle (80) and the transmission line (30) in front of the obstacle (80) is not in a straight line with the transmission line (30) behind the obstacle (80), but there is an intersecting angle of less than 180 degrees, the controller (7) first controls the robot to stop, that is, it controls the driving motor for the front wheel (11) and the driving motor for the rear wheel (21) to stop running, and controls the driving motor for the front counterweight (43) and the driving motor for the rear counterweight (53) to start working. The flexible front conveyor belt (44) moves the front counterweight (40) to the rear of the upper deck (13), and the flexible rear conveyor belt (54) moves the rear counterweight (50) to the rear of the lower deck (23), so that the center of gravity of the entire robot moves backward and makes the upper deck (13) and the lower deck (23) incline from the front to the rear. At this time, the rear wheel (20) balances the robot and the front wheel (10) is lifted off the transmission line (30) (see FIG. 5b);

3. The upper deck (13) rotates at a certain angle relative to the lower deck (23) by controlling the driving motor for rotating (60) to operate, and then the driving motor for the rear wheel (21) is controlled to drive the rear wheel (20) to move forward on the transmission line (30), ensuring that the front wheel (10) crosses the obstacle (80) (see FIG. 5c);

4. The front counterweight (40) is moved to the middle section of the upper deck (13) by the front weight-shifting mechanism, and the rear counterweight (50) is moved to the middle of the lower deck (23) by the rear weight-shifting mechanism, so that the front wheel (10) is lowered and gripped on the angled transmission line (30) (see FIGS. 3, 4 and 5d);

5. The front counterweight (40) is moved to the front of the upper deck (13) by the front weight-shifting mechanism, and the rear counterweight (50) is moved to the front of the lower deck (23) by the rear weight-shifting mechanism, so that the center of gravity of the whole robot is moved forward, and the upper deck (13) and the lower deck (23) are both inclined from the rear to the front. At this time, the front wheel (10) balances the robot and the rear wheel (20) is lifted off the transmission line (30) (see FIG. 5*e*);

6. The driving motor for the front wheel (11) is controlled to drive the front wheel (10) to move forward on the transmission line (30) to ensure that the rear wheel (20) crosses the obstacle 80, and the driving motor for rotating (60) is controlled to turn the lower deck (23) straight to the upper deck (see FIG. 5*f*);

7. The front counterweight (40) is moved to the middle section of the upper deck (13) by the front weight-shifting mechanism, and the rear counterweight (50) is moved to the middle section of the lower deck (23) by the rear weight-shifting mechanism so that the rear wheel (20) is lowered and gripped on the angled transmission line (30). By this means, both front wheel (10) and rear wheel (20) are gripped on the transmission line (30) to move forward (see FIG. 5*g*);

Due to the robot of this new utility patent application relying on weight-shifting to raise the front wheel (10) and the rear wheel (20) of the robot, in order to shorten the length of the robot, reduce its weight and reduce the power consumption when the front wheel (10) and the rear wheel (20) are raised, the front wheel (10) and the rear wheel (20) are designed with nonsymmetrical rims with one large and one small in diameter on two sides, and the front arm (12) is set outside the large diameter rim of the front wheel (10); and the rear arm (22) is set outside the large diameter rim of the rear wheel (20). In this way, the ascending heights of the front wheel (10) and the rear wheel (20) when raised, and the weights of the front counterweight (40) and the rear counterweight (50) can be reduced.

In order to maintain the operating reliability and stability of the front wheel (10) and the rear wheel (20), the diameters of the small-diameter rims of the front wheel (10) and the rear wheel (20) should be designed by taking into account the fact that the small-diameter rims of the front wheel (10) and the rear wheel (20) should cover at least three quarters of the diameter of the transmission line (30).

The self-balanced swiveling obstacle-crossing robot for transmission lines of this utility patent application has at least one of the front and rear running gears in contact with the transmission line in the obstacle-crossing process, thereby supporting and balancing the body of the robot, ensuring that the body of the robot can continue to move forward and ensuring the stability in the obstacle-crossing process. During the obstacle crossing process, the robot can move forward without stopping, thus improving obstacle-crossing efficiency. The wheel is simply lifted off the transmission line and does not make contact with obstacles, thus avoiding collisions between the robot and obstacles, avoiding the vibration of the transmission line and improving the stability during the obstacle crossing process. After the robot of this new utility patent application is equipped with various sensors, the state of the transmission line can be conveniently detected.

The self-balanced swiveling obstacle-crossing robot for transmission lines of this new utility patent application can be used for inspection, de-icing, painting and maintenance of transmission lines, and can also move in both directions on other suspended lines to carry out monitoring (use in schools, prisons, food processing, etc.)

The above examples illustrate the uses of this new utility patent application only and not the limitations. Those skilled in the relevant fields of the invention can also make various changes or modifications without departing from the spirit and scope of this new utility patent application. Therefore, all equivalent technical solutions should also fall within the scope of this new utility patent application and should be defined by the claims.

The invention claimed is:

1. A self-balanced swiveling obstacle-crossing robot for transmission lines, comprising a front running gear, a rear running gear, a front weight-shifting mechanism, a rear weight-shifting mechanism, a swiveling mechanism and a controller, characterized by the following:

the front running gear comprises an upper deck, a front arm set in the middle section of the upper deck, a driving motor for the front wheel set at the top of the front arm and a front wheel set on the driving motor for the front wheel;

the rear running gear comprises a lower deck, a rear arm set in the middle section of the lower deck, a driving motor for the rear wheel set at the top of the rear arm and a rear wheel set on the driving motor for the rear wheel;

the front and rear wheels are nonsymmetrical rim wheels and have the same size; the front wheel and the rear wheel move on the same transmission line by gripping on to the line respectively with their wheel rims on both sides, and the front arm and the rear arm are positioned on different sides of the transmission line;

the front weight-shifting mechanism comprises a front driving gear and a front driven gear respectively set at both ends of the upper deck, a front driving motor for weight shifting which is connected to the front driving gear, a flexible front conveyor belt that is annularly and tightly sleeved on the front driving gear and the front driven gear, and a front counterweight set on the flexible front conveyor belt;

the rear weight-shifting mechanism comprises a rear driving gear and a rear driven wheel which are respectively set at both ends of the lower deck, a rear driving motor for weight shifting that is connected to the rear driving gear, a flexible rear conveyor belt that is annularly and tightly sleeved on the rear driving gear and the rear driven gear, and a rear counterweight set on the flexible rear conveyor belt;

when the front counterweight moves to the rear of the upper deck and the rear counterweight moves to the rear of the lower deck, the upper deck and the lower deck are both inclined from the front to the rear, and the front wheel is lifted off the transmission line;

when the front counterweight moves to the front of the upper deck and the rear counterweight moves to the front of the lower deck, the upper deck and the lower deck are both inclined from the rear to the front, and the rear wheel is lifted off the transmission line;

the swiveling mechanism is set between the bottom surface of the upper deck at the rear and the top surface of the lower deck at the front and is driven by a motor set on the lower deck to horizontally rotate the upper deck relative to the lower deck;

the controller is respectively connected to the driving motor for the front wheel, the driving motor for the rear wheel, the driving motor for the front counterweight, the driving motor for the rear counterweight and the driving motor for rotating through signal lines.

2. The self-balanced swiveling obstacle-crossing robot for transmission lines according to claim 1, is characterized by the diameters of each side of the wheel rims of the front wheel and the rear wheel being different, one large and one small; the front arm is set outside the large-diameter wheel rim of the front wheel; the rear arm is set outside the large-diameter wheel rim of the rear wheel; the large-diameter wheel rim of the front wheel and the small-diameter wheel rim of the rear wheel are positioned on the same side of the same transmission line.

3. The self-balanced swiveling obstacle-crossing robot for transmission lines according to claim 1, is characterized by the swiveling mechanism comprising a driving gear set on the driving motor for rotating, a driven gear meshed with the driving gear and a bearing sleeved on a rotating shaft of the driven gear, and the outer ring of the bearing is fixed on the upper surface of the lower deck; the upper part of the rotating shaft of the driven gear is inserted into a shaft bore formed on the lower surface of the upper deck.

4. The self-balanced swiveling obstacle-crossing robot for transmission lines according to claim 1, is characterized by the flexible front conveyor belt and the flexible rear conveyor belt being chains or timing belts.

\* \* \* \* \*